Nov. 15, 1960 M. H. EMRICK 2,959,974
FORWARD AND REVERSE FRICTION DRIVE TAPPING ATTACHMENT
Filed May 28, 1958
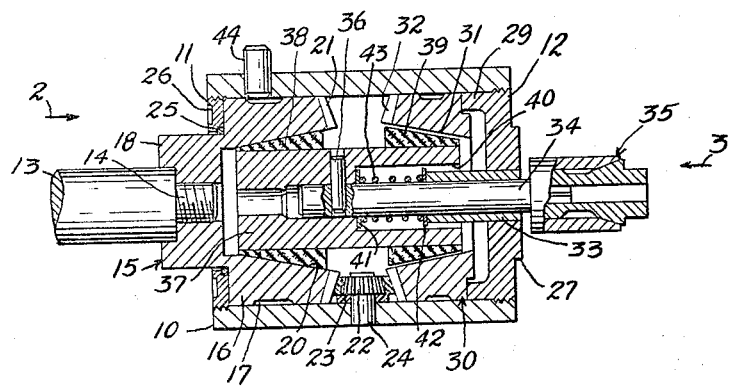
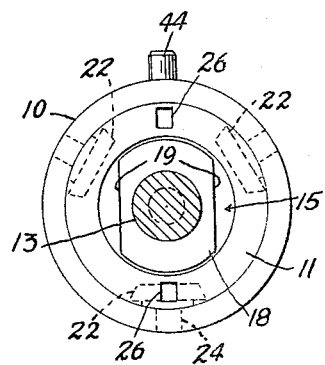
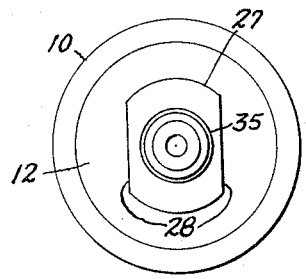
INVENTOR.
MELVIN H. EMRICK
BY
*Howard E. Thompson*
ATTORNEY

2,959,974

FORWARD AND REVERSE FRICTION DRIVE TAPPING ATTACHMENT

Melvin H. Emrick, 264 Mill Spring Road, Manhasset, N.Y.; Dorothea A. Emrick, executrix of said Emrick, deceased Filed May 28, 1958, Ser. No. 738,497

3 Claims. (Cl. 74—379)

This invention relates to tapping attachments, wherein the complete attachment is economically constructed so as to facilitate production and sale of the attachment at an extremely low price. More particularly, the invention deals with an attachment of the character described, wherein forward and reverse drive members are rotatably mounted in a tubular casing, with means at end portions of the casing for positioning the members therein, said members having bevelled gear faces to mesh with a plurality of idlers spaced circumferentially of the central portion of the casing.

Still more particularly, the invention deals with an attachment of the character described, wherein a clutch sleeve, having a pair of conical friction clutch elements, are fixed to the tool operating spindle of the attachment, tensional means being employed for normal support of the forward drive clutch element in engagement with the forward drive member of the attachment.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a sectional view through a tapping attachment made according to my invention, with parts of the construction broken away and with parts in elevation.

Fig. 2 is a view looking in the direction of the arrow 2 of Fig. 1; and

Fig. 3 is a view looking in the direction of the arrow 3 of Fig. 1, omitting background showing.

In constructing tapping attachments, from the standpoint of economy, all types of antifriction bearings are dispensed with and the attachment comprises a casing 10 in the form of a tube, the ends of the bore of which are tapped to receive end plates or nuts 11 and 12, the latter forming closures to end portions of the casing and also retaining the assemblage, later described, within the casing. At 13 is diagrammatically illustrated the end portion of a driving spindle of a drill press or the like having a reduced threaded portion 14 for attachment of the forward drive member 15 of the attachment.

The member 15 has a body portion 16 fitting freely, but snugly, within the casing 10, the periphery of the body portion being relieved, as at 17, to minimize frictional engagement with the casing. The body portion has a reduced projecting sleeve portion 18, threaded to receive 14. The sleeve portion 18 also preferably has flattened sides, as seen at 19 in Fig. 2 of the drawing, for support of the member 15 in attachment with the spindle 13.

The member 15 also has a conical bore 20 forming the clutch surface of this member and the inner portion of the body 16 has shaped thereon a bevelled gear 21, the gear 21 being adapted to engage a plurality of idler bevelled pinions 22, one of which is shown partly in elevation and in section in Fig. 1 of the drawing and the others being indicated in dotted lines in Fig. 2 of the drawing, three of these idlers being preferably employed.

It is also preferred that the idlers be formed of nylon, as are also spacer rings 23, one of which is shown in section in Fig. 1 of the drawing. The stub shafts or pins 24 supporting the idlers have a drive fit in the casing 10.

The nut 11 is in the form of a ring and the bore of the ring is shaped to support an O-ring 25 to effect a seal between the member 15 and the nut 11. The outer surface of the nut 11 also has spaced grooves or recesses 26 for reception of a wrench in attachment and detachment of the ring with the casing.

The other nut 12 has a slightly protruding portion 27 on its outer surface, which also includes flattened sides, as noted at 28 in Fig. 3 of the drawing, again for attachment of a tool in coupling and uncoupling the nut 12 with the casing. The nut 12 also includes an inwardly projecting annular sleeve portion 29, which forms a seat, upon which the reverse drive member 30 is adapted to rest when the attachment is in the forward drive position, as illustrated in Fig. 1 of the drawing.

The member 30 is in the form of a sleeve, having a conical clutch bore 31, generally similar to the bore 20. The inner surface of the member 30 also includes a bevelled gear portion 32, similar to the gear 21 and also operatively engaging the bevelled idler pinions 22.

The nut 12 includes a long bushing or plain bearing 33, which extends well into the casing and mounted in the bushing 33 is the tool driving spindle 34 supporting, on its protruding or free end, a suitable tap collet, as diagrammatically seen at 35 in Fig. 1 of the drawing. The collet is used for coupling a tap with the end of the spindle 34, as will be apparent.

Pinned to the inner end of the spindle 34, as seen at 36, is a clutch sleeve 37, the latter being preferably formed of aluminum to lighten the weight of the overall attachment. Supported on the periphery of end portions of the sleeve 37, for example, by suitable adhesives or cement, are forward and reverse drive conical clutch elements 38 and 39, respectively, adapted to engage the conical bores of the members 15 and 30, respectively in the forward and reverse drives of the spindle 34.

The bore, at one end of the sleeve 37, is enlarged as seen at 40 to clear the bushing 33, as well as two washers 41 and 42, the washer 41 seating in the base of the bore 40; whereas, the washer 42 seats upon the inner end of the bushing 33. Between these washers is arranged a coil spring 43, which serves to normally support the clutch element 38 in engagement with the forward drive member 15.

At this time, it will be understood that, in the forward drive of a tap, pressure engagement with the workpiece will firmly support the element 38 in gripping engagement with the member 15; whereas, in reversing the tap operation again, the downward movement of the spindle 34 against the action of the spring 43 will firmly support the element 39 in engagement with the member 30 in accomplishing the reverse drive of the attachment.

A stop pin or rod 44 is pressed into an aperture in one wall of the casing 10 at a suitable position and this rod is used in the drill press and operates in conjunction with a suitable stop to prevent rotation of the casing 10, as with other tapping attachments.

While the friction clutch element may be composed of any type and kind of friction material, to illustrate one adaptation and use of my invention, I have diagrammatically shown a combination of rubber and cork in the sectioning of these elements.

It is also preferred that the casing 10, the two nuts 11 and 12, as well as the bushing 33, be composed of bronze; whereas, the members 15, 30 and spindle 34 are preferably composed of hardened and ground steel. By this type of construction, the need for antifriction bearings is dispensed with and the entire attachment can be operated in oil, suitable means, not shown, being provided to charge the casing with the bath of oil as and when required.

Having fully described my invention, what I claim as new and desire to secure by Letters Patent is:

1. A tapping attachment comprising a tubular casing having a one diameter bore, a forward drive member rotatable in and protruding from one end of the casing, a reverse drive member rotatably mounted within the other end portion of the casing, both members having body portions with a running fit in the bore of said casing, said members having conical bores, adjacent surfaces of said members having bevelled gears meshing with a plurality of bevelled idler pinions, said pinions being mounted on shafts mounted in and spaced circumferentially of said casing, a clutch sleeve fixed to a spindle driven by said members, said sleeve being arranged within the casing and said conical bores of said members, end portions of said sleeve having forward and reverse drive conical friction clutch elements fixed to the periphery thereof for operative engagement with the bores of said forward and reverse drive members respectively, and tensional means operatively engaging said sleeve to normally support the forward drive element in operative engagement with said forward drive member.

2. An attachment as defined in claim 1, wherein the ends of the casing bore are threaded, and nuts coupled with the threaded ends of the casing to form closures for end portions of the casing.

3. An attachment as defined in claim 2, wherein one of the nuts supports sealing means for sealing the forward drive member in said casing, and the other nut includes a long bearing bushing extending into said sleeve.

References Cited in the file of this patent

UNITED STATES PATENTS

| | | |
|---|---|---|
| 1,177,490 | Craig | Mar. 28, 1916 |
| 1,475,982 | Buhr | Dec. 4, 1923 |
| 1,988,967 | Emrick | Jan. 22, 1935 |
| 2,541,790 | Sugdeu | Feb. 13, 1951 |
| 2,778,238 | Emrick | Jan. 22, 1957 |